June 20, 1939.  P. J. SPEICHER ET AL  2,163,501
BUCKET
Filed Aug. 15, 1938
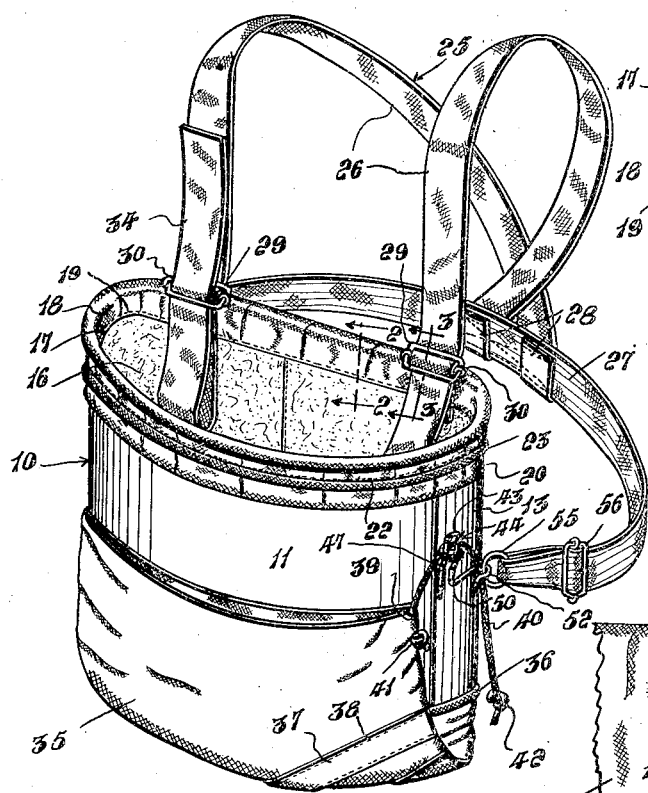
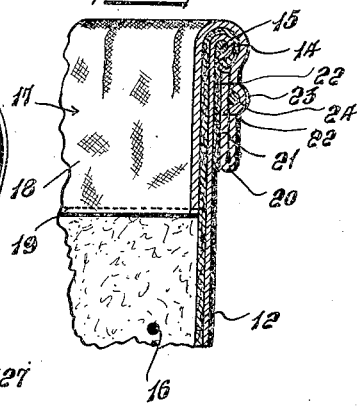
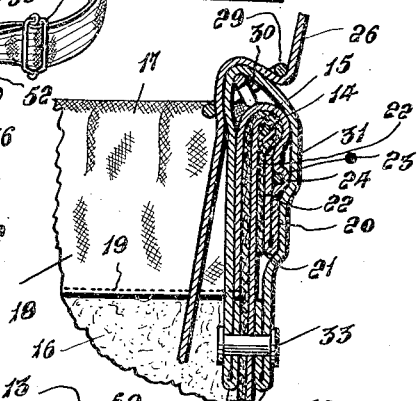
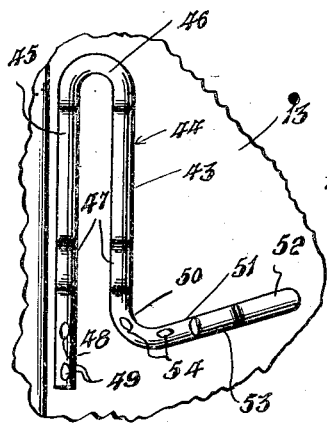
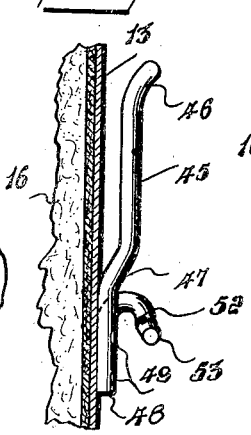
Inventors
Paul J. Speicher
Levi O. Stark
By Kimmel & Crowell
Attorneys Patented June 20, 1939

2,163,501

UNITED STATES PATENT OFFICE 2,163,501

BUCKET

Paul J. Speicher and Levi O. Stark, Urbana, Ind., assignors to The Cyclone Seeder Co. Inc., Urbana, Ind.

Application August 15, 1938, Serial No. 225,042

4 Claims. (Cl. 150—2)

This invention relates to fruit picking devices and more particularly to an improved receiver or collector which is adapted to be suspended in front of the picker to initially receive the fruit as it is picked from the tree.

An object of this invention is to provide a receiver which is provided with a metallic body open at the top and bottom and is also provided with a collapsible flexible body which may be collapsed against the lower portion of the metallic body so as to form a flexible bottom and an improved holding means for holding the cords connected to the flexible body in tight position against the opposite sides of the body.

Another object of this invention is to provide an improved combination clip which may be secured to the side of the metal body or basket which is adapted to yieldingly hold the bottom cords in tight position and also hold the waist or hip straps so that the basket will be firmly secured in front of the picker.

A further object of this invention is to provide an improved lining for a basket of this kind and means for attaching the lining to the basket or receptacle so that the fruit will not be damaged while being placed within the basket or receptacle, or during the time the fruit is positioned within the basket or receptacle.

A still further object of this invention is to provide an improved means for securing a bottom holding cord to the bottom or flexible body portion so that no metal will come in contact with the fruit during the time that the fruit is emptied from the receptacle as is the case where metal eyelets or grommets are secured to the flexible body or bottom.

Embodying the objects aforesaid, and to others which may hereinafter appear, the invention consists of the novel construction, combination and arrangement of parts as will be more specifically referred to and illustrated in the accompanying drawing, wherein embodiments of the invention are shown, but it is to be understood that changes, variations and modifications may be resorted to which fall within the scope of the invention as claimed.

In the drawing:

Figure 1 is a perspective view of a fruit picking receptacle constructed according to an embodiment of this invention showing the flexible body or bottom in a position to close the lower end of the non-flexible body, Figure 2 is an enlarged fragmentary sectional view taken on the line 2—2 of Figure 1, Figure 3 is an enlarged fragmentary sectional view taken on the line 3—3 of Figure 1, Figure 4 is a fragmentary side elevation of the receptacle showing the cord and waist band holding hooks or clips, Figure 5 is a detail front elevation of the hook or clip with a portion of the receptacle in section, and Figure 6 is a detail top plan of the hook with a portion of the receptacle in section.

Referring to the drawing the numeral 10 designates generally a non-flexible body or receptacle which preferably is constructed of sheet metal, and the body 10 is open at the upper and lower ends thereof. The body 10 is provided with an arcuate front wall 11 which is described on a relatively long radius and the ends of the front wall 11 merge into relatively short radius side wall 13. The side walls 13 are struck from a relatively small radius and merge into a rear wall 12. The rear wall 12 may be bent to a slight degree in the direction of the front wall 11 so that when the body 10 is suspended in front of the user the rear wall 12 will extend partly about the front of the user.

The upper and lower ends of the body 10 are provided with a rolled portion 14 forming a reinforcing bead, and a reinforcing wire or rod 15 is positioned inside the rolled portion 14 so that the upper and lower ends of the body 10 will be held against bending.

A lining member 16, constructed of felt or other like soft material is disposed throughout the inner face of the body 10 and is extended over the rolled edge 14 at the top of said body. The member 16 depends below the said rolled edge and is arranged against the upper portion of the outer face of body 10. The member 16 where it extends about the bead 14 provides a cushioning means on the upper edge of the body 10 in addition to providing a cushioning means interiorly of the body 10 so as to prevent bruising or otherwise injuring the fruit as this fruit is placed inside the body or receptacle 10.

A flexible cover 17 is positioned about the upper portion of the lining 16 and extends downwardly into the interior of the body 10 as shown in Figures 1 and 2. The extended portion 18 of the cover 17 has the inner and lower edge portion thereof secured as by stitching 19 to the lining 16. The cover 17 is extended about the upper edge of the body 10, depends from such and is then reverted to bear against its inner face as at 20. The reverted portion 20 of the covering member 17 bears against the outer face of the outer depending portion 21 of the member 16. The bend between the portion 20 and the body of member 17 is flush with the bottom edge of portion 21 of member 16. The body of member 17, the reverted portion 21 of the latter and the portion 21 of member 16 are secured together by a pair of spaced parallel rows of stitching 22. The rows of stitching 22, in connection with the outer part and portion 20 of member 17 provide an endless tunnel, hem, pocket or channel 23 disposed in circumferential relation with respect to body 10. Arranged within the tunnel 23 is a retaining member 24, in the form of a length of wire. The wire 24 may be relatively heavy wire and is extended through the tunnel 23, with the two ends of the wire brought out through the outer wall of the tunnel at a suitable point, and then twisted together so that the wire 24 will tightly bind the cover 17 and the lining 16 against the outer side of the body 10 at a point below the rounded upper edge of the latter.

In this manner it is not necessary to use rivets or other metallic fastening devices for securing the cover 17 and the lining 16 to the body 10. This elimination of metallic fastening members prevents the fruit from coming in contact with such fastening members so that the fruit will not be damaged from such contact as is the case with certain receptacles at present available.

A supporting strap structure 25 is adapted to be connected to the receptacle 10 for supporting the receptacle 10 in front of the user. This strap structure comprises a pair of shoulder straps 26 that cross each other at the rear, being secured in crossed relation at the rear to a waist or hip strap 27. The ends of the shoulder straps 26 are folded about the waist or hip strap 27, as shown at 28, and then stitched or otherwise securely fastened thereto.

In this manner the strain applied to the rear portions of the straps 26 will not be applied directly to the stitching as would be the case where the ends of the straps 26 are not reverted. The front or free ends of the straps 26 are each extended through a buckle or loop member 29 which is carried by a bar 30. The bar 30 is secured to the rear wall 12 at the upper edge thereof by means of a strap 31 which extends from the inside of the body 10 over the upper edge of the latter and then downwardly over the outer side to a point below the member 17. The opposite ends of each buckle securing strap 31 are reverted as at 32 and these reverted ends are tightly secured respectively against the member 16 and to the outer face of the body 10 by means of a headed fastening member 33 in the form of a rivet or like fastening member. The members 33 also act to secure the lining member 16 to the inner face of body 10. The free or front ends of the straps 26 are passed through the loop members 29 over and bear on the upper bends of the straps 31. The said upper bends cover the bar 30. The free ends of straps 26 are then passed downwardly inside the receptacle 10 between the inner portion of the members 29 and the securing straps 31 as shown in Figure 3. If desired the free end of a strap 26 may be looped upwardly as shown at 34 in Figure 1.

A tubular combined closure and outlet member 35 is secured as by a bead 36 to the lower end of the body 10 and this member 35 comprises a body formed of canvas or other relatively heavy flexible material which is provided on the outer face of the rear thereof with a plurality of parallel strips 37 secured to the body of the member 35 as by stitching 38. These strips 37 are preferably constructed of flexible material, such as very heavy canvas and an outer protecting surface for the member 35 when the latter is in bottom closing position with relation to body 10 as shown in Figure 1.

The member 35 is provided at opposite sides thereof and in the lower portion with a pair of tubular rope receiving channels 39 opening at the outside of the body of member 35. A rope or cord 40 is extended through each channel 39 and has its ends arranged exteriorly of the member 35. One end of the cord 40 is provided with a knot 41. The other end of the cord 40 may also be provided with a knot 42 so as to prevent ravelling of the cord 40. The cords 40 provide a means whereby the member 35 may be either held in a receptacle closing position or may be let down so that the fruit in the rigid body 10 may be permitted to flow out through the member 35 and into a collecting receptacle.

In order to provide a means whereby each cord 40 may be quickly secured to the body 10 or quickly released therefrom respectively for moving member 35 to and from closing relation with respect to body 10, I have provided a clip member generally designated as 43. The clip member 43 comprises a U-shaped rope securing member 44 which comprises a pair of parallel portions 45 which are disposed in outwardly offset relation to the outside 13 of the receptacle 10, and the bight of the U-shaped member 44 is outwardly curved as at 46 so as to provide guide means by means of which the rope may be guided between the parallel legs 45 and the outside of the receptacle 10.

The lower ends of the parallel legs 45 are provided with inwardly and downwardly projecting extensions 47 terminating in a parallel portion 48 on one leg thereof which is adapted to be welded as at 49 to the outer side of the receptacle 10. The other leg of the U-shaped member 44 is provided with an inwardly offset portion 50 which is extended rearwardly and upwardly as at 51 and it terminates in a hook 52 having an outwardly extending bill 53. The connecting portion 50 between the hook 52 and the U-shaped member 44 is spot welded as at 54 to the side of the receptacle 10 as shown in Figure 4.

The opposite ends of the waist or hip strap 27 are provided with rings or eye members 55 which are adapted to engage the hooks 52 as shown in Figure 1 so that the strap 27 will firmly hold the body 10 against the front of the user. The strap 27 may be adjusted as to length by means of an adjusting loop 56 similar to the loop member 29.

The hook member 57 has the connecting portion 51 thereof with the U-shaped member 54 disposed on a curve coinciding with the curvature of the side 13 so that the greater portion of the inner side of the hook 52 will lie flat against the outer side 13 of the body 10.

In the use of this device the body 10 is adapted to be suspended in front of the user by means of the shoulder straps 26 and held tightly against the front of the body of the user by means of the waist or hip straps 27 engaging the hooks 52. During the picking or collecting of the fruit, the flexible member 35 will be disposed across the bottom of body 11 with the open portion thereof positioned along the front side 11 of the body 10 as shown in Figure 1. The member 15 in the position aforesaid will coact with the body 10 to form a closed bottom receptacle.

The cords 40 may be wrapped once about the clips 44 and then the free end thereof may be engaged with the hook 52 so as to prevent the ring 55 from moving forwardly and out of the hook 52.

The fruit is positioned in the receptacle and will engage the cushioned lining 16 and as no metal is exposed on the inside of the body 10 the fruit will not be bruised or injured by contact with any metal as is the case where rivets or grommets are used for attaching the lining 16 to the body 10.

After the receptacle has been filled to the desired degree the cords 40 may be released from the hooks 52 and the clip members 44 and member 35 then let down so as to provide a flexible outlet or discharge tube or mouth which may be positioned over a receiving receptacle. The fruit will gravitatingly flow out of the member 35 into the receiving receptacle. After all of the gathered or picked fruit has been discharged into the receiving receptacle, the cords 40 may be pulled upwardly to the position shown in Figure 1 wherein the member 35 will constitute for a portion of the length thereof a flexible bottom for the non-flexible body 10.

A collecting receptacle constructed according to this invention can be manufactured at a relatively small cost, and by means of the construction hereinbefore described the receptacle will last for a relatively long period of time. This picking receptacle may readily have a new member 35 substituted for a damaged, impaired or worn one and a new lining member 16 substituted for damaged liner 16 without discarding the entire structure. This statement also applies to the cover. As the retaining wire 24 is twisted together, it may be readily removed to permit of the cover and lining being removed from body 10 and a new wire substituted to secure a new cover and lining in position with respect to body 10.

The lining member 16 includes what may be termed a depending inner portion disposed throughout the inner face of body 10, a rounded intermediate portion which encompassing the rounded upper edge of body 10 and a depending outer portion which bears against the upper portion of the outer face of body 10 below the rounded upper edge of the latter. The upper ends of the outer and inner depending portions merge into the intermediate portion. The cover 15 includes what may be termed a depending inner part, a rounded intermediate part and a depending outer part having its lower portion reverted and positioned against the outer face of the outer portion of member 16 and against the inner face of the outer part of cover 17. The said depending inner part of the cover is positioned against and secured to the upper part of the inner portion of the lining member 16. The said intermediate part of the cover incloses and bears against the intermediate part of the lining member.

What we claim is:

1. In a fruit picker's receptacle of that type including a hollow rigid body open at each end and having a rounded upper edge, and a tubular flexible combined closure and outlet member for and extended from the lower end of said body, the combination of a flexible lining member having a depending inner portion, a rounded intermediate portion and a depending outer portion for respectively positioning throughout against the inner face of said body, encompassing throughout said upper edge and bearing against the upper part of the outer face of said body below said upper edge, a flexible cover having an inner part positioned against the upper part of and secured to said inner portion, an intermediate part bearing against said intermediate portion and an outer part depending from said intermediate part, said outer part having its lower portion reverted against its inner face and bearing against the outer portion of the lining member, a pair of spaced parallel rows of stitching securing the outer portion of the lining member and the outer part of the cover together, said rows of stitching coacting with the outer part of the cover to form an endless tunnel disposed in circumferential relation with respect to said body, and retaining means extending throughout said tunnel for securing the outer portion of the lining member and outer part of the cover in abutting relation and to said body below said upper edge.

2. In a fruit picker's receptacle of that type including a hollow rigid body open at each end and having a rounded upper edge, and a tubular flexible combined closure and outlet member for and extended from the lower end of said body, the combination of a flexible lining member having a depending inner portion, a rounded intermediate portion and a depending outer portion for respectively positioning throughout against the inner face of said body, encompassing throughout said upper edge and bearing against the upper part of the outer face of said body below said upper edge, a flexible cover having an inner part positioned against the upper part of and secured to said inner portion, an intermediate part bearing against said intermediate portion and an outer part depending from said intermediate part, said outer part having its lower portion reverted against its inner face and bearing against the outer portion of the lining member, a pair of spaced parallel rows of stitching securing the outer portion of the lining member and the outer part of the cover together, said rows of stitching coacting with the outer part of the cover to form an endless tunnel disposed in circumferential relation with respect to said body, and retaining means extending throughout said tunnel for securing the outer portion of the lining member and outer part of the cover in abutting relation and to said body below said upper edge, the said outer portion of the lining member having its bottom edge flush with the bend provided by the reverted portion of said outer part of the cover.

3. In a fruit picker's receptacle of that type including a hollow rigid body open at each end having a rounded upper edge, and a tubular flexible combined closure and outlet member for and extended from the lower end of said body, the combination of a flexible lining member having a depending inner portion, a rounded intermediate portion and a depending outer portion for respectively positioning throughout against the inner face of said body, encompassing throughout said upper edge and bearing against the upper part of the outer face of said body below said upper edge, a flexible cover having an inner part positioned against the upper part of and secured to said inner portion, an intermediate part bearing against said intermediate portion and an outer part depending from said intermediate part, said outer part having its lower portion reverted against its inner face and bearing against the outer portion of the lining member, a pair of spaced parallel rows of stitching securing the outer portion of the lining member and the outer part of the cover together, said rows of stitching coacting with the outer part of the cover to form an endless tunnel disposed in circumferential relation with respect to said body, retaining means extending throughout said tunnel for securing the outer portion of the lining member and outer part of the cover in abutting relation and to said body below said upper edge, a pair of spaced buckle elements positioned at said upper edge for adjustably connecting a pair of shoulder straps to said body, each element including a cross bar, a pair of securing straps for said elements extending through the latter and over the cross bars, each of said securing straps having their end terminal portions reverted upon their inner faces, said securing straps being positioned against the said inner and outer parts of and depending below the cover, the reverted end terminal portions of the securing straps being positioned against the inner portion of the lining member and outer face of said body, and means for securing the securing straps, said body and lining member together.

4. In a fruit picker's receptacle of that type including a hollow body open at each end for suspension from the shoulders of a user, a tubular flexible combined closure and outlet member secured at its inner end to the lower end of said body, and a waist strap for connection to the sides of said body, the combination of a pair of upstanding attaching elements adapted to be secured intermediate their ends to opposite sides of said body and each being formed with an upper offset portion and a hook-like portion arranged below and rearwardly of the offset portion, cords adapted to be connected to the outer of said member for lifting the latter to position a portion thereof across the lower end of said body to form a bottom for the latter and the outer end terminal portion of said member in upstanding relation with respect to the front of said body, means adapted to be carried by the ends of the waist strap for engaging within said hook-like portions for coupling said strap to the sides of said body, and said cords having a part of their length wrapped about said offset portions for retaining said member in the positions aforesaid and another part of their length extending through said hook-like portions forwardly of said means for retaining the latter in said hook-like portions.

PAUL J. SPEICHER.
LEVI O. STARK.